(12) United States Patent
Koga et al.

(10) Patent No.: US 11,667,156 B2
(45) Date of Patent: Jun. 6, 2023

(54) TIRE

(71) Applicant: SUMITOMO RUBBER INDUSTRIES, LTD., Hyogo (JP)

(72) Inventors: Hiroaki Koga, Hyogo (JP); Hiroshi Kikuchi, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 0 days.

(21) Appl. No.: 17/689,476

(22) Filed: Mar. 8, 2022

(65) Prior Publication Data
US 2022/0297478 A1 Sep. 22, 2022

(30) Foreign Application Priority Data

Mar. 17, 2021 (JP) .............................. JP2021-043701

(51) Int. Cl.
  *B60C 11/00* (2006.01)
  *B60C 11/01* (2006.01)
  *B60C 11/03* (2006.01)

(52) U.S. Cl.
  CPC ........ *B60C 11/005* (2013.01); *B60C 11/0008* (2013.01); *B60C 11/0058* (2013.01); *B60C 11/0075* (2013.01); *B60C 11/0083* (2013.01); *B60C 11/0327* (2013.01); *B60C 11/01* (2013.01); *B60C 2011/0016* (2013.01);
  (Continued)

(58) Field of Classification Search
  CPC .......................... B60C 11/0041; B60C 11/005
  See application file for complete search history.

(56) References Cited

U.S. PATENT DOCUMENTS

| | | | |
|---|---|---|---|
| 2009/0255613 A1* | 10/2009 | Zhang | ..................... B60C 11/00 |
| | | | 152/209.5 |
| 2010/0130663 A1* | 5/2010 | Taguchi | ................ B60C 11/005 |
| | | | 524/432 |

(Continued)

FOREIGN PATENT DOCUMENTS

| | | | | |
|---|---|---|---|---|
| CN | 108698450 | 10/2019 | | |
| JP | 11321214 A | * 11/1999 | ......... | B60C 11/0083 |

(Continued)

OTHER PUBLICATIONS

Machine Translation: JP-2015131599-A, Nagase M, (Year: 2023).*

(Continued)

*Primary Examiner* — Kendra Ly
(74) *Attorney, Agent, or Firm* — Greenblum & Bernstein, P.L.C.

(57) ABSTRACT

In a tire, a tread includes a cap layer forming a part of an outer surface of the tire, a base layer disposed inwardly of the cap layer in a radial direction, and an intermediate layer disposed between the cap layer and the base layer in the radial direction. A loss tangent of the intermediate layer at 30° C. is less than a loss tangent of the cap layer at 30° C. and a loss tangent of the base layer at 30° C. is less than the loss tangent of the intermediate layer at 30° C. The tread includes at least two three-layer body portions formed of the cap layer, the intermediate layer, and the base layer, and at least one two-layer body portion that is formed of the cap layer and the base layer and disposed between a first three-layer body portion and a second three-layer body portion.

18 Claims, 6 Drawing Sheets

(52) U.S. Cl.
CPC ............... *B60C 2011/0025* (2013.01); *B60C 2011/0033* (2013.01)

(56) References Cited

U.S. PATENT DOCUMENTS

| | | |
|---|---|---|
| 2012/0234442 A1 | 9/2012 | Mayni |
| 2017/0197470 A1* | 7/2017 | Maruoka ............... B29D 30/08 |
| 2019/0001751 A1 | 1/2019 | Trowbridge et al. |

FOREIGN PATENT DOCUMENTS

| | | |
|---|---|---|
| JP | 2002-211209 | 7/2002 |
| JP | 2004042786 A * | 2/2004 |
| JP | 2015-131599 | 7/2015 |
| JP | 2015131599 A * | 7/2015 |
| JP | 2017-210044 | 11/2017 |

OTHER PUBLICATIONS

Machine Translation: JP-2004042786-A, Amino N, (Year: 2023).*
Machine Translation: JP-11321214-A, Koyama K, (Year: 2023).*
Extended European Search Report in Corresponding European Patent Application No. 22159167.0, dated Jul. 11, 2022.

\* cited by examiner

TIRE

CROSS REFERENCE TO RELATED APPLICATION

The present application claims priority to Japanese patent application JP2021-043701, filed on Mar. 17, 2021, the entire contents of which are incorporated herein by reference in its entirety.

BACKGROUND

Technical Field

The present disclosure relates to a tire.

Background Art

A tire having low rolling resistance is obtained by using rubber having a low-heat-generation property in a tread. A grip force of the rubber having a low-heat-generation property is lower as compared with rubber having a heat generation property that allows a high grip force to be exhibited. Therefore, in a case where rubber having a low-heat-generation property is used in a tread, for example, braking performance (hereinafter, also referred to as wet performance) on a wet road surface is degraded. It is difficult to obtain good balance between rolling resistance and wet performance Various studies have been made in order to achieve reduction of rolling resistance and enhancement of wet performance (for example Japanese Laid-Open Patent Publication No. 2017-210044).

For example, in the tire disclosed in Japanese Laid-Open Patent Publication No. 2017-210044, a tread has three layers stacked in the radial direction. Among the three layers, a first layer (hereinafter, also referred to as cap layer) disposed on the outer side is formed of rubber that is most likely to generate heat in consideration of wet performance A third layer (hereinafter, also referred to as base layer) disposed on the inner side is formed of rubber that is least likely to generate heat in consideration of rolling resistance. A second layer (hereinafter, also referred to as intermediate layer) disposed between the first layer and the third layer is formed of rubber that is less likely to generate heat than the first layer and more likely to generate heat than the third layer.

The tread is worn due to running. If the cap layer is worn, the intermediate layer comes into contact with a road surface. Contribution of the rubber used for the intermediate layer to wet performance is more important than contribution thereof to rolling resistance.

Tires are required to further reduce rolling resistance in consideration of the environment. In a case where the above-described intermediate layer is formed of rubber that is less likely to generate heat than conventional rubber, rolling resistance can be reduced. However, the rubber that is less likely to generate heat has low grip force. If the intermediate layer is formed of rubber that is less likely to generate heat, deviation between grip force of the cap layer and grip force of the intermediate layer is increased. In this case, in a case where the tread is worn and a ground contact surface in contact with a road surface is changed from the cap layer to the intermediate layer, wet performance may be significantly degraded.

The present disclosure has been made in view of such circumstances, and an object of the present disclosure is to provide a tire that can achieve reduction of rolling resistance while preventing wet performance from being significantly degraded due to abrasion.

SUMMARY

A tire according to one aspect of the present disclosure includes a tread configured to come into contact with a road surface. At least three circumferential grooves are formed in the tread. A ground contact surface obtained by mounting the tire on a normal rim, adjusting an internal pressure of the tire to a normal internal pressure, applying a load that is 70% of a normal load, to the tire, as a vertical load, and bringing the tire into contact with a planar road surface, is a reference ground contact surface. The tread includes a cap layer forming a part of an outer surface of the tire, a base layer disposed inwardly of the cap layer in a radial direction, and an intermediate layer disposed between the cap layer and the base layer in the radial direction. A loss tangent of the intermediate layer at 30° C. is less than a loss tangent of the cap layer at 30° C. and a loss tangent of the base layer at 30° C. is less than the loss tangent of the intermediate layer at 30° C. The tread includes at least two three-layer body portions formed of the cap layer, the intermediate layer, and the base layer, and at least one two-layer body portion that is formed of the cap layer and the base layer and disposed between a first three-layer body portion and a second three-layer body portion.

DETAILED DESCRIPTION

Figure 1:
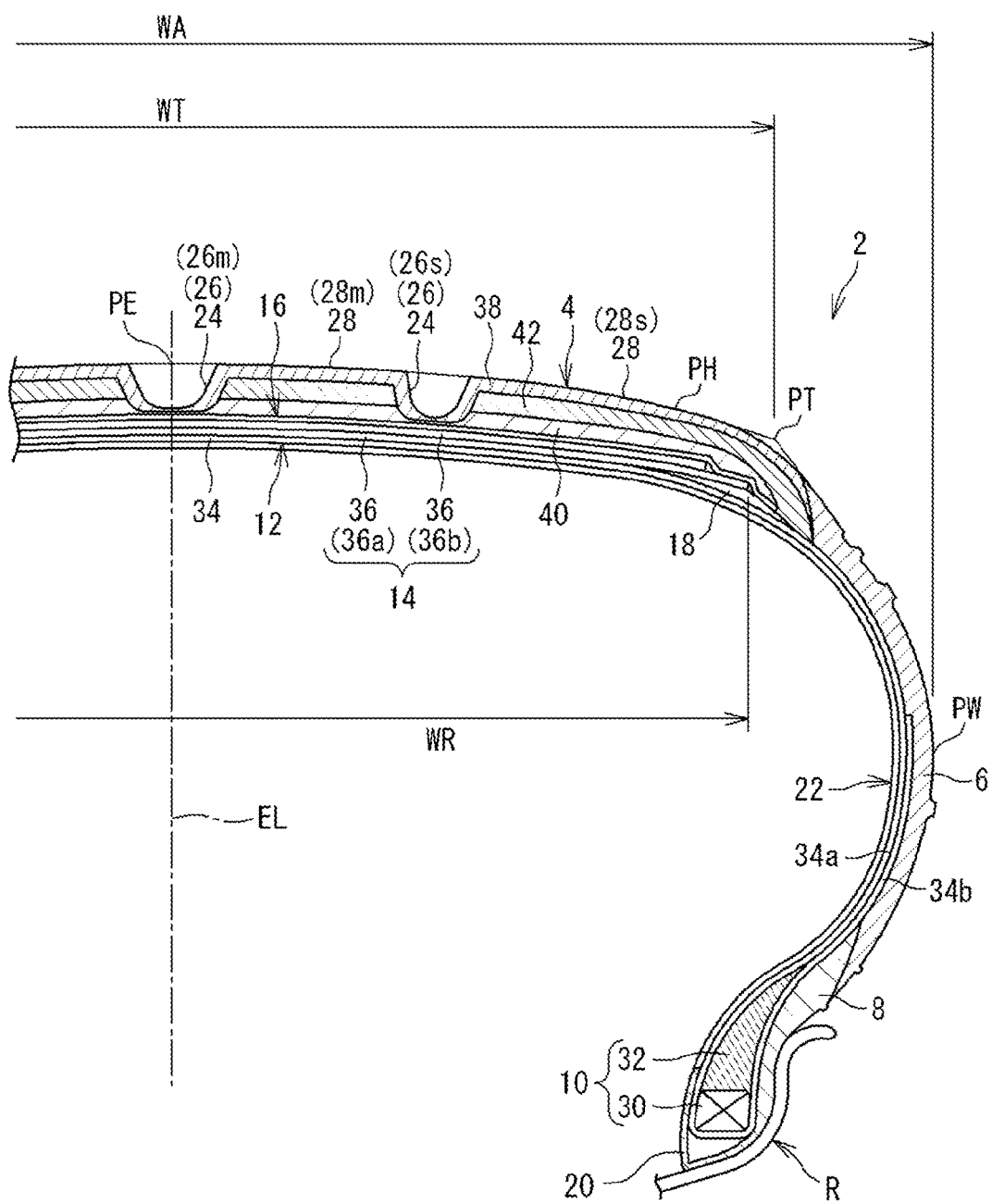
FIG. 1 is a cross-sectional view of a part of a tire according to one embodiment of the present disclosure.

The present disclosure will be described below in detail based on a preferred embodiment with appropriate reference to the drawings.

In the present disclosure, a state where a tire is mounted on a normal rim, an internal pressure of the tire is adjusted to a normal internal pressure, and no load is applied to the tire, is referred to as a normal state.

In the present disclosure, unless otherwise specified, dimensions and angles of components of the tire are measured in the normal state. In a case where dimensions and angles of components on a meridian cross-section of a tire cannot be measured in a state where the tire is mounted on a normal rim, the dimensions and angles are measured by conforming a distance between left and right beads to a distance between beads of a tire mounted on a normal rim, on a cross-section of the tire which is obtained by cutting the tire along a plane including a rotation axis.

The normal rim represents a rim defined by a standard on which the tire is based. Examples of the normal rim include the "standard rim" in the JATMA standard, the "Design Rim" in the TRA standard, and the "Measuring Rim" in the ETRTO standard.

The normal internal pressure represents an internal pressure defined by a standard on which the tire is based. Examples of the normal internal pressure include the "maximum air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard.

The normal load represents a load defined by a standard on which the tire is based. Examples of the normal load include the "maximum load capacity" in the JATMA standard, the "maximum value" recited in "TIRE LOAD LIMITS AT VARIOUS COLD INFLATION PRESSURES" in the TRA standard, and the "LOAD CAPACITY" in the ETRTO standard.

In the present disclosure, crosslinked rubber refers to a molded product, of a rubber composition, obtained by pressurizing and heating the rubber composition. The rubber composition is uncrosslinked rubber obtained by mixing base rubber and chemicals in a kneading machine such as a Banbury mixer. The crosslinked rubber is also referred to as vulcanized rubber and the rubber composition is also referred to as unvulcanized rubber.

Examples of the base rubber include natural rubber (NR), butadiene rubber (BR), styrene-butadiene rubber (SBR), isoprene rubber (IR), ethylene-propylene rubber (EPDM), chloroprene rubber (CR), acrylonitrile butadiene rubber (NBR), and isobutylene-isoprene-rubber (IIR). Examples of the chemicals include a reinforcing agent such as carbon black and silica, a plasticizer such as aromatic oil, a filler such as zinc oxide, a lubricant such as stearic acid, an antioxidant, a processing aid, sulfur, and a vulcanization accelerator. Selection of the base rubber and the chemicals, contents of the selected chemicals, and the like are determined as appropriate according to the specifications of the component, such as a tread and sidewalls, to which the rubber composition is applied.

In the present disclosure, a loss tangent (also referred to as tan δ), at a temperature of 30° C., of a component formed of the crosslinked rubber among components of the tire is measured by using a viscoelasticity spectrometer ("YES" manufactured by Iwamoto Seisakusho) under the following conditions in accordance with the standard of JIS K6394.

Initial strain=10%
Dynamic strain=2%
Frequency=10 Hz
Deformation mode=tension

In this measurement, a test piece is sampled from the tire. In a case where a test piece cannot be sampled from the tire, a test piece is sampled from sheet-shaped crosslinked rubber (hereinafter, also referred to as rubber sheet) obtained by pressurizing and heating a rubber composition used for forming a component to be measured, at a temperature of 170° C., for 12 minutes.

In the present disclosure, elongation at break of a component formed of crosslinked rubber among components of the tire is measured under a temperature atmosphere at 23° C. by using a tensile tester in accordance with the standard of JIS K6251. A No. 3 dumbbell test piece used for the measurement is sampled from a rubber sheet obtained by pressurizing and heating a rubber composition used for forming a component to be measured at a temperature of 170° C. for 12 minutes.

In the present disclosure, a LAT abrasion index represents an index for evaluating abrasion resistance of a component formed of crosslinked rubber among components of the tire. For the component to be evaluated, the greater the LAT abrasion index is, the more excellent abrasion resistance is.

The LAT abrasion index is measured by using a friction tester, for example, a LAT tester (Laboratory Abrasion and Skid Tester) such as LAT100 (manufactured by VMI) in accordance with the standard of JIS K6264-1 (LAT100 abrasion test). In this measurement, a rubber composition used for forming a component to be measured is vulcanized and molded in a mold for a test piece at 170° C. for 20 minutes to prepare the test piece. A volume loss (volume loss of the component to be evaluated) of the test piece is measured by using the test piece under the conditions that a load is 50 N, a speed is 20 km/h, and a slip angle is 5°. A volume loss (reference volume loss) of a rubber composition as a reference is similarly measured. A LAT abrasion index of the component to be evaluated is obtained by using the volume loss of the component to be evaluated and the reference volume loss according to the following expression.

$$\text{LAT abrasion index} = (\text{reference volume loss}/\text{volume loss of component to be evaluated}) \times 100$$

The LAT abrasion index represents a volume loss, of a component to be evaluated, which is represented as an index with the index of the reference volume loss being 100. The rubber composition as a reference is not particularly limited. For example, in a case where the LAT abrasion index of a component forming a tread is to be obtained, a rubber composition for a cap layer of a conventional tread formed of two-layers that are the cap layer and a base layer is used as a rubber composition serving as the reference.

FIG. 1 illustrates a part of a tire 2 according to one embodiment of the present disclosure. The tire 2 is for a passenger car. FIG. 1 illustrates a part of a cross-section (hereinafter, also referred to as a meridian cross-section) of the tire 2 taken along a plane including the rotation axis of the tire 2. In FIG. 1, the left-right direction represents an axial direction of the tire 2, and the up-down direction represents a radial direction of the tire 2. The direction perpendicular to the surface of the drawing sheet in FIG. 1 represents a circumferential direction of the tire 2.

In FIG. 1, an alternate long and short dash line EL represents an equator plane of the tire 2. The tire 2 has a shape that is symmetric about the equator plane except for a tread pattern and decorative portions such as patterns and characters formed at the outer surface of the tire 2.

In FIG. 1, the tire 2 is mounted on a rim R. The rim R is a normal rim. The inside of the tire 2 is inflated with air to adjust an internal pressure of the tire 2. The tire 2 mounted on the rim R is also referred to as a tire-rim complex. The tire-rim complex includes the rim R and the tire 2 mounted on the rim R.

In FIG. 1, a position represented by reference character PW is an outer end of the tire 2 in the axial direction. In a case where a decorative portion such as a pattern or a character is on the outer surface, the outer end PW is specified based on an imaginary outer surface obtained on the assumption that no decorative portion is provided.

In FIG. 1, a length represented by reference character WA is the maximal width, that is, a cross-sectional width (see JATMA or the like) of the tire 2. The cross-sectional width WA of the tire 2 represents a distance in the axial direction from one of the outer ends PW to the other of the outer ends PW. The outer end PW represents a position (hereinafter, referred to as maximal width position) at which the tire 2 has the maximal width.

The tire 2 includes a tread 4, a pair of sidewalls 6, a pair of clinches 8, a pair of beads 10, a carcass 12, a belt 14, a band 16, a pair of cushions 18, a pair of chafers 20, and an inner liner 22.

The tread 4 comes into contact with a road surface at the outer surface of the tread 4. The tread 4 has grooves 24. Thus, a tread pattern is formed.

In the tire 2, at least three circumferential grooves 26 extending continuously in the circumferential direction are formed in the tread 4. Thus, at least four land portions 28 aligned in the axial direction are formed in the tread 4. The tire 2 shown in FIG. 1 has the three circumferential grooves 26 formed in the tread 4, so that the four land portions 28 are formed. The circumferential grooves 26 form a part of the grooves 24 forming the tread pattern.

In FIG. 1, a position represented by reference character PE is the equator of the tire 2. The equator PE is an intersection point of the outer surface of the tread 4 and the equator plane. As shown in FIG. 1, in a case where the groove 24 is formed at the equator plane, the equator PE is specified based on an imaginary outer surface of the tread 4 obtained on the assumption that the groove 24 is not provided.

Each sidewall 6 is continuous with the end of the tread 4. The sidewall 6 is disposed inwardly of the tread 4 in the radial direction. The sidewall 6 extends along the carcass 12 from the end of the tread 4 toward the clinch 8. The sidewall 6 is formed of crosslinked rubber produced in consideration of cut resistance.

Each clinch 8 is disposed inwardly of the sidewall 6 in the radial direction. The clinch 8 comes into contact with the rim R. The clinch 8 is formed of crosslinked rubber produced in consideration of abrasion resistance.

Each bead 10 is disposed inwardly of the clinch 8 in the axial direction. The bead 10 includes a core 3l and an apex 32. The core 30 includes a steel wire which is not shown.

The apex 32 is disposed outwardly of the core 30 in the radial direction. The apex 32 is tapered outwardly. The apex 32 is formed of crosslinked rubber having a high stiffness.

The carcass 12 is disposed inwardly of the tread 4, the pair of sidewalls 6, and the pair of clinches 8. The carcass 12 extends on and between one of the beads 10 and the other of the beads 10. The carcass 12 has a radial structure.

The carcass 12 includes at least one carcass ply 34. The carcass 12 of the tire 2 is formed of one carcass ply 34 from the viewpoint of weight reduction.

The carcass ply 34 includes a ply body 34a and a pair of turned-up portions 34b. The ply body 34a extends on and between one of the cores 30 and the other of the cores 30. The turned-up portions 34b are continuous with the ply body 34a and are turned up around the cores 30, respectively, from the inner side toward the outer side in the axial direction. In the tire 2, the end of the turned-up portion 34b is disposed outwardly of the maximal width position PW in the radial direction.

The carcass ply 34 includes multiple carcass cords aligned with each other, which are not shown. The carcass cords are covered with topping rubber. Each of the carcass cords intersects the equator plane. The carcass cord is formed of an organic fiber. Examples of the organic fiber include nylon fibers, rayon fibers, polyester fibers, and aramid fibers.

The belt 14 is disposed inwardly of the tread 4 in the radial direction. The belt 14 is stacked on the carcass 12 from the outer side in the radial direction. In FIG. 1, a length represented by reference character WR is a width of the belt 14 in the axial direction. The axial width WR represents a distance in the axial direction from one end of the belt 14 to the other end of the belt 14. In the tire 2, the axial width WR of the belt 14 is not less than 65% of the cross-sectional width WA and not greater than 85% thereof.

The belt 14 includes at least two layers 36 stacked in the radial direction. In the tire 2, the belt 14 includes two layers 36 stacked in the radial direction. In the two layers 36, the layer 36 disposed on the inner side is an inner layer 36a, and the layer 36 disposed on the outer side is an outer layer 36b. As shown in FIG. 1, the inner layer 36a is wider than the outer layer 36b. A length from the end of the outer layer 36b to the end of the inner layer 36a is not less than 3 mm and not greater than 10 mm.

Each of the inner layer 36a and the outer layer 36b includes multiple belt cords aligned with each other, which are not shown. The belt cords are covered with topping rubber. Each of the belt cords is inclined relative to the equator plane. The material of the belt cords is steel.

The band 16 is disposed between the tread 4 and the belt 14 in the radial direction. The band 16 is stacked on the belt 14 in a portion inward of the tread 4.

The band 16 includes a helically wound band cord which is not shown. The band cord extends substantially in the circumferential direction. Specifically, an angle of the band cord relative to the circumferential direction is not greater than 5°. The band 16 has a jointless structure. In the tire 2, a cord formed of an organic fiber is used as the band cord. Examples of the organic fiber include nylon fibers, rayon fibers, polyester fibers, and aramid fibers.

In the tire 2, the band 16 is formed as a full band in which both ends oppose each other across the equator PE. The band 16 is wider than the belt 14. A length from the end of the belt 14 to the end of the band 16 is not less than 3 mm and not greater than 7 mm. The band 16 covers the entirety of the belt 14. The band 16 may include a pair of edge bands that are spaced from each other in the axial direction and cover the ends of the full band and the ends of the belt 14. The band 16 may be formed as the pair of edge bands only.

The cushions 18 are spaced from each other in the axial direction. Each cushion 18 is disposed between the ply body 34a of the carcass 12, and the end of the belt 14 and the end of the band 16. The cushion 18 is formed of crosslinked rubber having a low stiffness.

Each chafer 20 is disposed inwardly of the bead 10 in the radial direction. The chafer 20 comes into contact with the rim R. In the tire 2, the chafer 20 is formed of fabric and rubber impregnated in the fabric.

The inner liner 22 is disposed inwardly of the carcass 12. The inner liner 22 forms an inner surface of the tire 2. The inner liner 22 is formed of crosslinked rubber having a low gas permeation coefficient. The inner liner 22 retains an internal pressure of the tire 2.

In FIG. 1, a position represented by reference character PH is a position on the outer surface of the tread 4. The position PH corresponds to an axially outer end of a ground contact surface at which the tire 2 is in contact with a road surface.

The ground contact surface for specifying the position PH is obtained by using, for example, a ground contact surface shape measuring device (not shown). The ground contact surface is obtained by the device in a manner in which a load that is 70% of the normal load is applied as a vertical load to the tire 2, and the tire 2 is brought into contact with a planar road surface, in a state where a camber angle of the tire 2 in the normal state is 0°. In the tire 2, the ground contact surface obtained in this manner is a reference ground contact surface, and a position, on the outer surface of the tread 4, corresponding to the axially outer end of the reference ground contact surface is the above-described position PH. In the tire 2, the position PH is a reference ground contact end.

Figure 2:
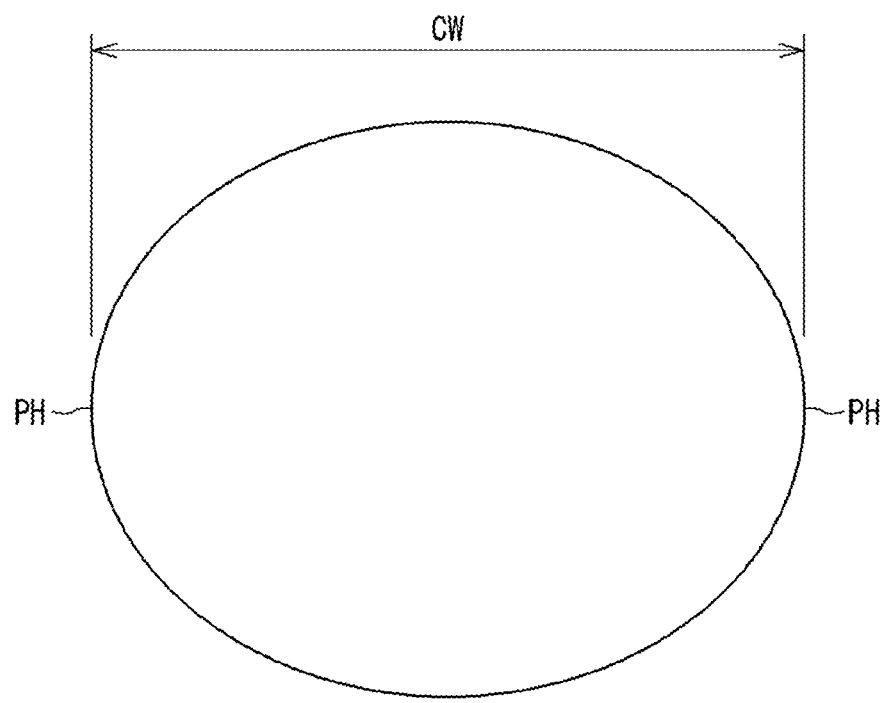
FIG. 2 shows an image for illustrating a ground contact width of a reference ground contact surface.

FIG. 2 illustrates an image of the reference ground contact surface. In FIG. 2, the up-down direction corresponds to the circumferential direction of the tire 2 and the left-right direction corresponds to the axial direction of the tire 2. The direction perpendicular to the surface of the drawing sheet in FIG. 2 corresponds to the radial direction of the tire 2.

In FIG. 2, a length represented by reference character CW is a ground contact width of the reference ground contact surface. The ground contact width CW represents a distance in the axial direction from one of the reference ground contact ends PH to the other of the reference ground contact ends PH. The ground contact width CW is represented as a maximal width of the reference ground contact surface.

Figure 3:
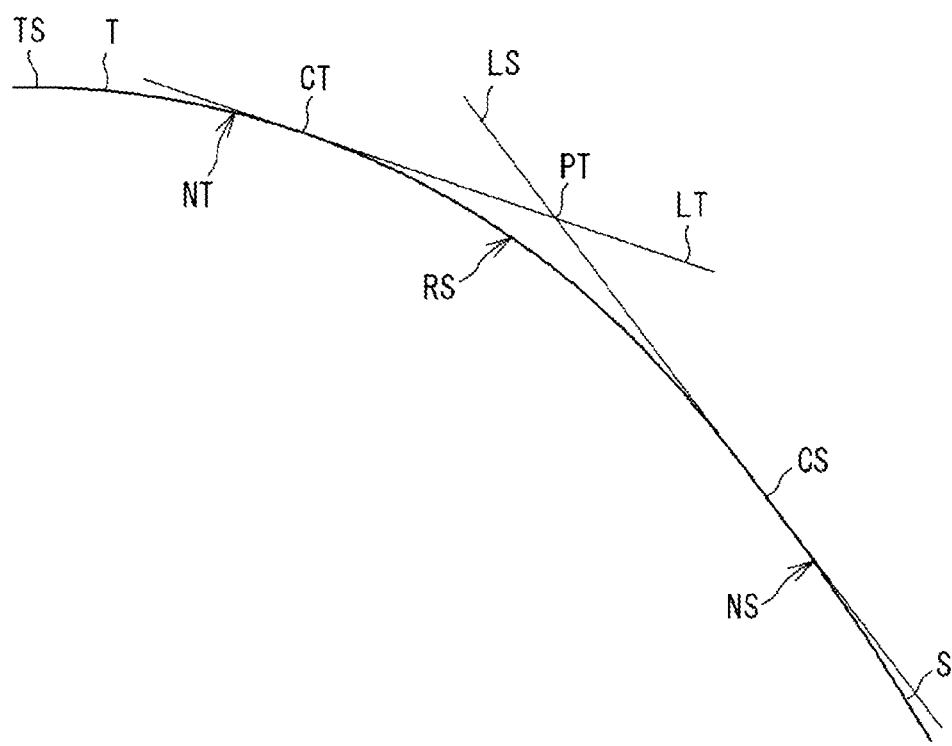
FIG. 3 is an enlarged cross-sectional view of a contour of a shoulder portion of the tire shown in FIG. 1.

FIG. 3 illustrates a part of the tire 2 in FIG. 1. In FIG. 3, the left-right direction represents the axial direction of the tire 2, and the up-down direction represents the radial direction of the tire 2. The direction perpendicular to the surface of the drawing sheet in FIG. 3 represents the circumferential direction of the tire 2.

FIG. 3 illustrates a contour of a shoulder portion of the tire 2 on the meridian cross-section. The contour shown in FIG. 3 is obtained by measuring the outer surface shape of the tire 2 in the normal state by a displacement sensor.

On the meridian cross-section, the contour of the outer surface (hereinafter, referred to as tire outer surface TS) of the tire 2 is formed by connecting a plurality of contour lines each formed as a straight line or an arc. In the present disclosure, the contour line formed as a straight line or an arc is simply referred to as a contour line. The contour line formed as a straight line is referred to as a straight contour line, and the contour line formed as an arc is referred to as a curved contour line.

The tire outer surface TS includes a tread surface T and a pair of side surfaces S continuous with the ends of the tread surface T. On the meridian cross-section, the contour of the tread surface T includes a plurality of curved contour lines having different radii. In the tire 2, in the plurality of curved contour lines included in the contour of the tread surface T, a curved contour line having the smallest radius is disposed at the end portion of the tread surface T and is connected to the side surface S. On the meridian cross-section, the contour of the tire outer surface TS includes, on each end portion of the tread surface T, a curved line portion that is a curved contour line connected to the side surface S and formed as an arc having the smallest radius among the plurality of curved contour lines included in the contour of the tread surface T. In FIG. 3, the curved line portion is represented by reference character RS.

On the contour of the tire outer surface TS, the curved line portion RS is in contact with a contour line (hereinafter, referred to as inner adjacent contour line NT) adjacent to the curve line portion RS on the inner side in the axial direction, at a contact point CT. The curved line portion RS is in contact with a contour line (hereinafter, referred to as outer adjacent contour line NS), forming a contour of the side surface S, adjacent to the curved line portion RS on the outer side in the axial direction, at a contact point CS. The contour of the tire outer surface TS includes the inner adjacent contour line NT that is disposed inwardly of the curved line portion RS in the axial direction and is in contact with the curved line portion RS, and the outer adjacent contour line NS that is disposed outwardly of the curved line portion RS in the axial direction and is in contact with the curved line portion RS.

In FIG. 3, a solid line LT is a line tangent to the curved line portion RS at the contact point CT at which the inner adjacent contour line NT and the curved line portion RS are in contact with each other. A solid line LS is a line tangent to the curved line portion RS at the contact point CS at which the outer adjacent contour line NS and the curved line portion RS are in contact with each other. A position represented by reference character PT is an intersection point of the tangent line LT and the tangent line LS. In the tire 2, the intersection point PT represents a tread reference end.

In FIG. 1, a length represented by a double-headed arrow WT is a tread width. The tread width WT represents a distance in the axial direction from one of the tread reference ends PT to the other of the tread reference ends PT. In the tire 2, a ratio (WT/WA) of the tread width WT to the cross-sectional width WA is not less than 70% and not greater than 90%. A ratio (CW/WT) of the ground contact width CW of the reference ground contact surface as described above to the tread width WT is not less than 70% and not greater than 90%.

As described above, in the tire 2, the tread 4 has the three circumferential grooves 26. In the tire 2, arrangement of the three circumferential grooves 26, the groove depth, and the groove width are not particularly limited. As the arrangement of the circumferential grooves of the tire, the groove depth, and the groove width, a typical arrangement, groove depth, and groove width are applied to the tread 4.

In the tire 2, in the three circumferential grooves 26, the circumferential grooves 26 disposed on the outer side in the axial direction are shoulder circumferential grooves 26s. The circumferential groove 26 disposed inwardly of the shoulder circumferential grooves 26s is a middle circumferential groove 26m.

As described above, in the tire 2, the tread 4 has the four land portions 28. In the four land portions 28, the land portions 28 disposed on the equator plane side are middle land portions 28m, and the land portions 28 disposed outwardly of the middle land portions 28m are shoulder land portions 28s. In the tire 2, among the land portions 28 formed in the tread 4, the land portions 28 disposed on the outer side in the axial direction are the shoulder land portions 28s.

The shoulder land portion 28s includes the reference ground contact end PH. The middle circumferential groove 26m is disposed between the left and right middle land portions 28m. In the tire 2, the middle circumferential groove 26m is disposed at the equator plane. The middle circumferential groove 26m is also referred to as a center circumferential groove.

Figure 4:
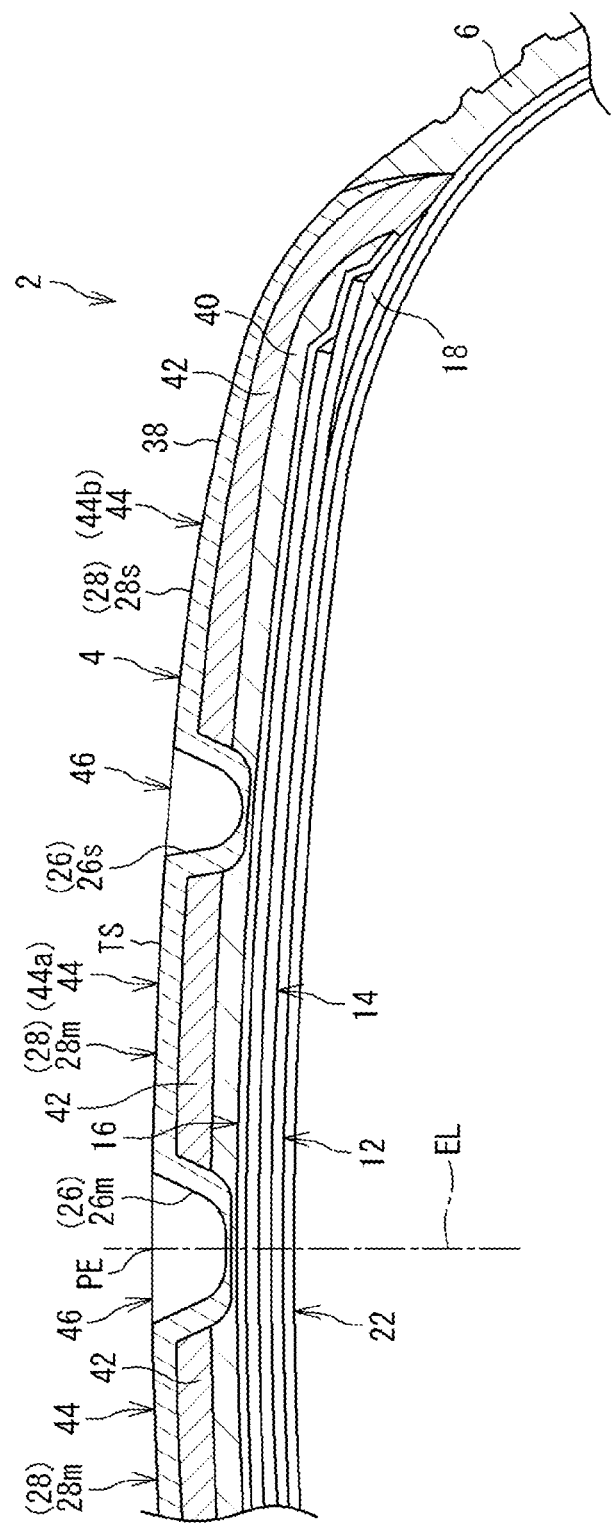
FIG. 4 is a cross-sectional view of a part of the tire shown in FIG. 1.

FIG. 4 illustrates a part of the tire 2 in FIG. 1. FIG. 4 illustrates the tread portion of the tire 2. In FIG. 4, the left-right direction represents the axial direction of the tire 2, and the up-down direction represents the radial direction of the tire 2. The direction perpendicular to the surface of the drawing sheet in FIG. 4 represents the circumferential direction of the tire 2.

In the tire 2, the tread 4 includes a cap layer 38, a base layer 40, and an intermediate layer 42. The cap layer 38 forms a part of the tire outer surface TS. The base layer 40 is disposed inwardly of the cap layer 38 in the radial direction. The intermediate layer 42 is disposed between the cap layer 38 and the base layer 40 in the radial direction. In the tire 2, in a portion in which the cap layer 38, the base layer 40, and the intermediate layer 42 extend in the axial direction, the cap layer 38, the base layer 40, and the intermediate layer 42 are structured to have almost uniform thicknesses in a portion other than a portion near the tread reference end PT. The thicknesses of the cap layer 38, the base layer 40, and the intermediate layer 42 are determined as appropriate in consideration of wet performance and rolling resistance.

In the tire 2, a loss tangent LTm of the intermediate layer 42 at 30° C. is less than a loss tangent LTc of the cap layer 38 at 30° C. A loss tangent LTb of the base layer 40 at 30° C. is less than the loss tangent LTm of the intermediate layer 42 at 30° C. The cap layer 38, the base layer 40, and the intermediate layer 42 are formed of crosslinked rubbers having different heat generation properties, respectively. The cap layer 38 is most likely to generate heat and the base layer 40 is least likely to generate heat. The intermediate layer 42 has a heat generation property that is between the heat generation property of the cap layer 38 and the heat generation property of the base layer 40.

The cap layer 38 having the high loss tangent LTc exhibits a high grip force, and thus contributes to enhancement of wet performance. The base layer 40 having the low loss tangent LTb is less likely to generate heat and thus contributes to reduction of rolling resistance. The intermediate layer 42 having the intermediate loss tangent LTm that is between the loss tangent LTc and the loss tangent LTb contributes to enhancement of wet performance in a case where the loss tangent LTm is set as a loss tangent closer to the loss tangent LTc. The intermediate layer 42 contributes to reduction of rolling resistance in a case where the loss tangent LTm is set as a loss tangent closer to the loss tangent LTb.

As shown in FIG. 4, the tread 4 of the tire 2 includes a three-layer body portion 44 as a stacked body of the cap layer 38, the intermediate layer 42, and the base layer 40, and a two-layer body portion 46 as a stacked body of the cap layer 38 and the base layer 40. The two-layer body portion 46 is disposed between a first three-layer body portion 44a disposed on one side of the tire 2 in the axial direction and a second three-layer body portion 44b disposed on the other side of the tire 2 in the axial direction. The tread 4 includes at least two three-layer body portions 44 formed of the cap layer 38, the intermediate layer 42, and the base layer 40, and at least one two-layer body portion 46 that is disposed between the first three-layer body portion 44a and the second three-layer body portion 44b, and is formed of the cap layer 38 and the base layer 40. The tread 4 of the tire 2 has four three-layer body portions 44 and three two-layer body portions 46, and the three-layer body portion 44 and the two-layer body portion 46 alternate in the axial direction.

In a case where the tire 2 is new, the cap layer 38 forming the outer surface of the tread 4 comes into contact with a road surface. The cap layer 38 exhibits a high grip force, so that the tire 2 exhibits good wet performance. The tread 4 is worn due to running. In the tread 4, the two-layer body portion 46 does not include the intermediate layer 42. The two-layer body portion 46 is disposed between the two three-layer body portions 44 in the axial direction. In the axial direction, the cap layer 38 of the two-layer body portion 46 is disposed adjacent to the intermediate layer 42 of the three-layer body portion 44. Even if the tread 4 is worn until the intermediate layer 42 of the three-layer body portion 44 is exposed, the ground contact surface of the tire 2 includes the cap layer 38 of the two-layer body portion 46. In the tire 2, even in a case where the intermediate layer 42 having the loss tangent LTm close to the loss tangent LTb of the base layer 40 is used, the cap layer 38 exhibits a high grip force, and, therefore, even if the tread 4 is worn, significant degradation of wet performance is prevented. The intermediate layer 42 contributes to reduction of rolling resistance, whereby the tire 2 can achieve reduction of rolling resistance while preventing wet performance from being significantly degraded due to abrasion.

The loss tangent LTc of the cap layer 38 at 30° C. is preferably not less than 0.15. Thus, the cap layer 38 can contribute to enhancement of wet performance. From this viewpoint, the loss tangent LTc is more preferably not less than 0.16 and even more preferably not less than 0.17. The cap layer 38 comes into contact with a road surface. From the viewpoint of enhancement of wet performance, the higher the loss tangent LTc is, the better the effect is. However, in a case where the loss tangent LTc is high, heat generation is caused. The cap layer 38 having generated heat may cause the temperature of the intermediate layer 42 to become higher than expected. From the viewpoint that the temperature of the entirety of the tread 4 is maintained stable and low rolling resistance can be maintained, the loss tangent LTc of the cap layer 38 at 30° C. is preferably not higher than 0.30, more preferably not higher than 0.28, and even more preferably not higher than 0.27.

As described above, in the tire 2, the loss tangent LTm of the intermediate layer 42 at 30° C. is less than the loss tangent LTc of the cap layer 38 at 30° C. Specifically, a ratio (LTm/LTc) of the loss tangent LTm of the intermediate layer 42 at 30° C. to the loss tangent LTc of the cap layer 38 at 30° C. is preferably not less than 40% and not greater than 90%.

The ratio (LTm/LTc) is set to be not less than 40%, whereby the intermediate layer 42 can assuredly have required stiffness and can effectively contribute to enhancement of wet performance From this viewpoint, the (LTm/LTc) is more preferably not less than 50% and even more preferably not less than 60%.

The ratio (LTm/LTc) is set to be not greater than 90%, whereby the intermediate layer 42 can effectively contribute to reduction of rolling resistance. From this viewpoint, the (LTm/LTc) is more preferably not greater than 80% and even more preferably not greater than 70%.

In the tire 2, from the viewpoint that the intermediate layer 42 effectively contributes to reduction of rolling resistance, the loss tangent LTm of the intermediate layer 42 at 30° C. is preferably not higher than 0.15, more preferably not higher than 0.14, and even more preferably not higher than 0.13. From the viewpoint that the intermediate layer 42 can assuredly have required stiffness and can effectively contribute to enhancement of wet performance, the loss tangent LTm of the intermediate layer 42 at 30° C. is preferably not less than 0.10 and more preferably not less than 0.11.

As described above, in the tire 2, the loss tangent LTb of the base layer 40 at 30° C. is less than the loss tangent LTm of the intermediate layer 42 at 30° C. Specifically, the loss tangent LTb of the base layer 40 at 30° C. is preferably not higher than 0.10. Thus, the base layer 40 effectively contributes to reduction of rolling resistance. From this viewpoint, the loss tangent LTb is more preferably not higher than 0.09. The less the loss tangent LTb of the base layer 40 is, the better the effect is. Therefore, a preferable lower limit is not set.

As shown in FIG. 4, in the tire 2, the circumferential groove 26 is formed at the two-layer body portion 46 formed in the tread 4. The circumferential grooves 26 may be formed at all the two-layer body portions 46 formed in the tread 4. Alternatively, the circumferential grooves 26 may be formed at a part of the two-layer body portions 46 formed in the tread 4. In the tire 2, the circumferential groove 26 is not formed at the three-layer body portion 44. The three-layer body portion 44 is a main component of the land portion 28.

The three-layer body portion 44 forms the land portion 28. As shown in FIG. 4, in the tire 2, the first three-layer body portion 44a is a main component of the middle land portion 28m, and the second three-layer body portion 44b is a main component of the shoulder land portion 28s.

Figure 5:
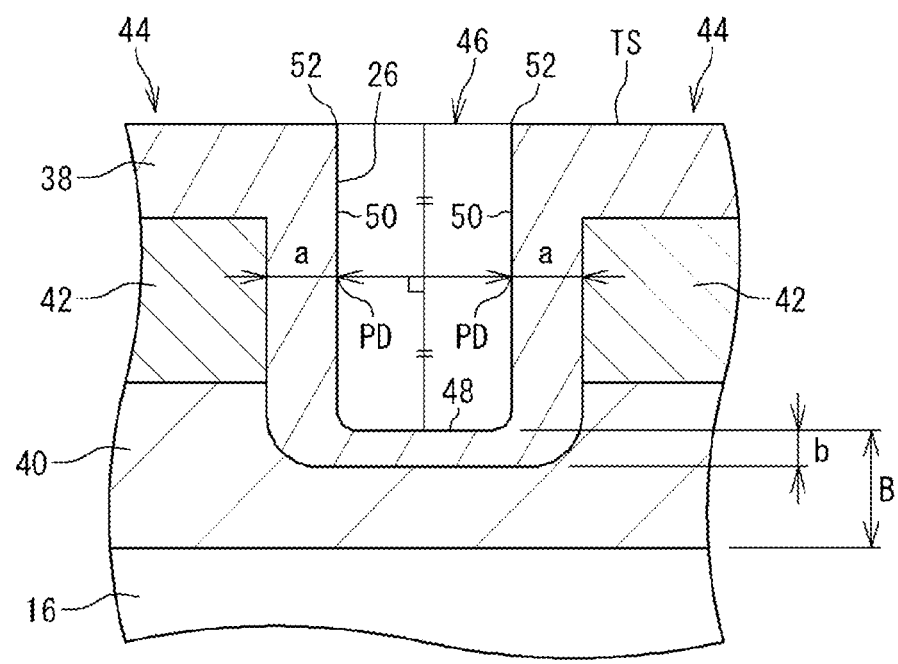
FIG. 5 is a schematic cross-sectional view of a structure of a tread at a circumferential groove.

FIG. 5 schematically illustrates the two-layer body portion 46 in which the circumferential groove 26 is formed. The circumferential groove 26 includes a groove bottom 48, and a pair of groove walls 50. The groove walls 50 connect between the groove bottom 48 and edges 52 of the circumferential groove 26. The edge 52 of the circumferential groove 26 is a boundary between the circumferential groove 26 and the outer surface of the tread 4.

As shown in FIG. 5, the groove bottom 48 and the groove walls 50 of the circumferential groove 26 are formed of the cap layer 38. In other words, the entirety of the circumferential groove 26 is formed of the cap layer 38. The circumferential groove 26 does not include, for example, an interface between the cap layer 38 and the intermediate layer 42. Therefore, generation of a crack originating from the interface, which may be observed in a conventional tire, is prevented. Even when the crack is generated in the circumferential groove 26 due to a force acting on the circumferential groove 26, growth of the crack is inhibited. In the tire 2, generation of the crack in the circumferential groove 26 is prevented. The tire 2 has excellent crack growth resistance at the circumferential groove 26.

In the tire 2, the edge 52 of the circumferential groove 26 is formed of the cap layer 38. The groove walls 50 of the circumferential groove 26 are formed of the cap layer 38. Therefore, even if the tread 4 is worn, the edge 52 of the circumferential groove 26 is formed of the cap layer 38, and the cap layer 38 is formed of crosslinked rubber produced in consideration of contact with a road surface. Therefore, even if the tread 4 is worn, the intermediate layer 42 does not form the edge 52 of the circumferential groove 26, so that chipping is unlikely to occur at the edge 52 of the circumferential groove 26. The tire 2 also has excellent chipping resistance.

The tire 2 can achieve reduction of rolling resistance while preventing wet performance from being significantly degraded due to abrasion, and also has excellent crack growth resistance and chipping resistance.

In FIG. 5, a position represented by reference character PD is a position at which the groove depth of the circumferential groove 26 is half the entire groove depth thereof. A length represented by reference character a is a thickness of the cap layer 38 of the groove wall 50 at the position PD at which the groove depth of the circumferential groove 26 is 50% of the entire groove depth thereof. In the tire 2, a portion which forms, in the cap layer 38 forming the groove wall 50, an interface with the intermediate layer 42 has the uniform thickness a. A length represented by reference character B is a thickness of the two-layer body portion 46 at the groove bottom 48 of the circumferential groove 26. A length represented by reference character b is a thickness of the cap layer 38 at the groove bottom 48 of the circumferential groove 26.

In the tire 2, when A represents the total of the thicknesses a of the cap layer 38 in the groove walls 50 at the position PD at which the groove depth of the circumferential groove 26 is 50% of the entire groove depth thereof, a ratio (A/CW) of the total A to the ground contact width CW of the reference ground contact surface is preferably not less than 5% and not greater than 15%. In the tire 2, the tread 4 has the three two-layer body portions 46, and the circumferential groove 26 is formed in each of the two-layer body portions 46. Therefore, the sum of the thicknesses a of the cap layer 38 in the six groove walls is used as the above-described total A.

The ratio (A/CW) is set to be not less than 5%, whereby the cap layer 38 included in the ground contact surface in a worn state effectively contributes to enhancement of wet performance From this viewpoint, the ratio (A/CW) is more preferably not less than 7% and even more preferably not less than 9%.

The ratio (A/CW) is set to be not greater than 15%, whereby influence of the cap layer 38 on rolling resistance is reduced. From this viewpoint, the ratio (A/CW) is more preferably not greater than 13% and even more preferably not greater than 11%.

In the tire 2, a ratio (b/B) of the thickness b of the cap layer 38 to the thickness B of the two-layer body portion 46 at the groove bottom 48 of the circumferential groove 26 is preferably not less than 30% and not greater than 70%.

The ratio (b/B) is set to be not less than 30%, whereby the thickness b of the cap layer 38 required at the groove bottom 48 is assured. In the tire 2, even when a crack is generated in the groove bottom 48 of the circumferential groove 26 due to a force acting on the circumferential groove 26, growth of the crack is inhibited. The tire 2 has excellent crack growth resistance at the circumferential groove 26. From this viewpoint, the ratio (b/B) is more preferably not less than 40% and even more preferably not less than 45%.

The ratio (b/B) is set to be not greater than 70%, whereby influence of the cap layer 38 on rolling resistance is reduced. From this viewpoint, the ratio (b/B) is more preferably not greater than 60% and even more preferably not greater than 55%.

In the tire 2, the three-layer body portion 44 as a main component of the land portion 28 includes both the cap layer 38 and the intermediate layer 42. If abrasion resistance of the cap layer 38 and abrasion resistance of the intermediate layer 42 deviate from each other, an abrasion amount may be different between the cap layer 38 and the intermediate layer 42. In this case, a stepped portion may be generated near the boundary between the cap layer 38 and the intermediate layer 42, and the outer appearance of the tire 2 may deteriorate. From the viewpoint of maintaining good outer appearance, preferably, a LAT abrasion index LATc of the cap layer 38 and a LAT abrasion index LATm of the intermediate layer 42 are substantially equal to each other. Specifically, a difference (LATc−LATm) between the LAT abrasion index LATc of the cap layer 38 and the LAT abrasion index LATm of the intermediate layer 42 is preferably not less than −10 and not greater than 10. The difference (LATc−LATm) is more preferably not less than −5 and not greater than 5. The difference (LATc−LATm) is even more preferably 0.

As described above, the three-layer body portion 44 of the tire 2 includes both the cap layer 38 and the intermediate layer 42. If an elongation at break Ec of the cap layer 38 and an elongation at break Em of the intermediate layer 42 deviate from each other, a crack may be likely to be generated at an interface between the cap layer 38 and the intermediate layer 42. In this case, chipping is likely to occur at the land portion 28, and chipping resistance may be reduced. From the viewpoint of maintaining good chipping resistance, a difference (Ec−Em) between the elongation at break Ec of the cap layer 38 and the elongation at break Em of the intermediate layer 42 is preferably not less than −20% and not greater than 20%. The difference (Ec−Em) is more preferably not less than −10% and not greater than 10%, even more preferably not less than −5% and not greater than 5%, and particularly preferably 0%.

As described above, in the tire 2, the main component of the shoulder land portion 28s is the three-layer body portion 44b. The shoulder land portion 28s includes the intermediate layer 42 that is less likely to generate heat than the cap layer 38. The shoulder land portion 28s makes a greater contribution to reduction of rolling resistance than a shoulder land portion formed of the cap layer 38 and the base layer 40.

In the tire 2, the ends of the band 16 and the belt 14 are covered by the base layer 40, and the end of the base layer 40 is covered by the intermediate layer 42. At the end of the tread 4, the intermediate layer 42 is disposed between the outer surface of the tire 2 and the base layer 40. At the end portion of the tread 4, the base layer 40 is disposed so as to be distant from the outer surface of the tire 2. In the tire 2, in cornering (hereinafter, also referred to as harsh cornering) in which such a high inertial force as to wear the end portion of the tread 4 is generated, exposure of the base layer 40 is prevented. The tire 2 also exhibits excellent durability during the harsh cornering.

Figure 6:
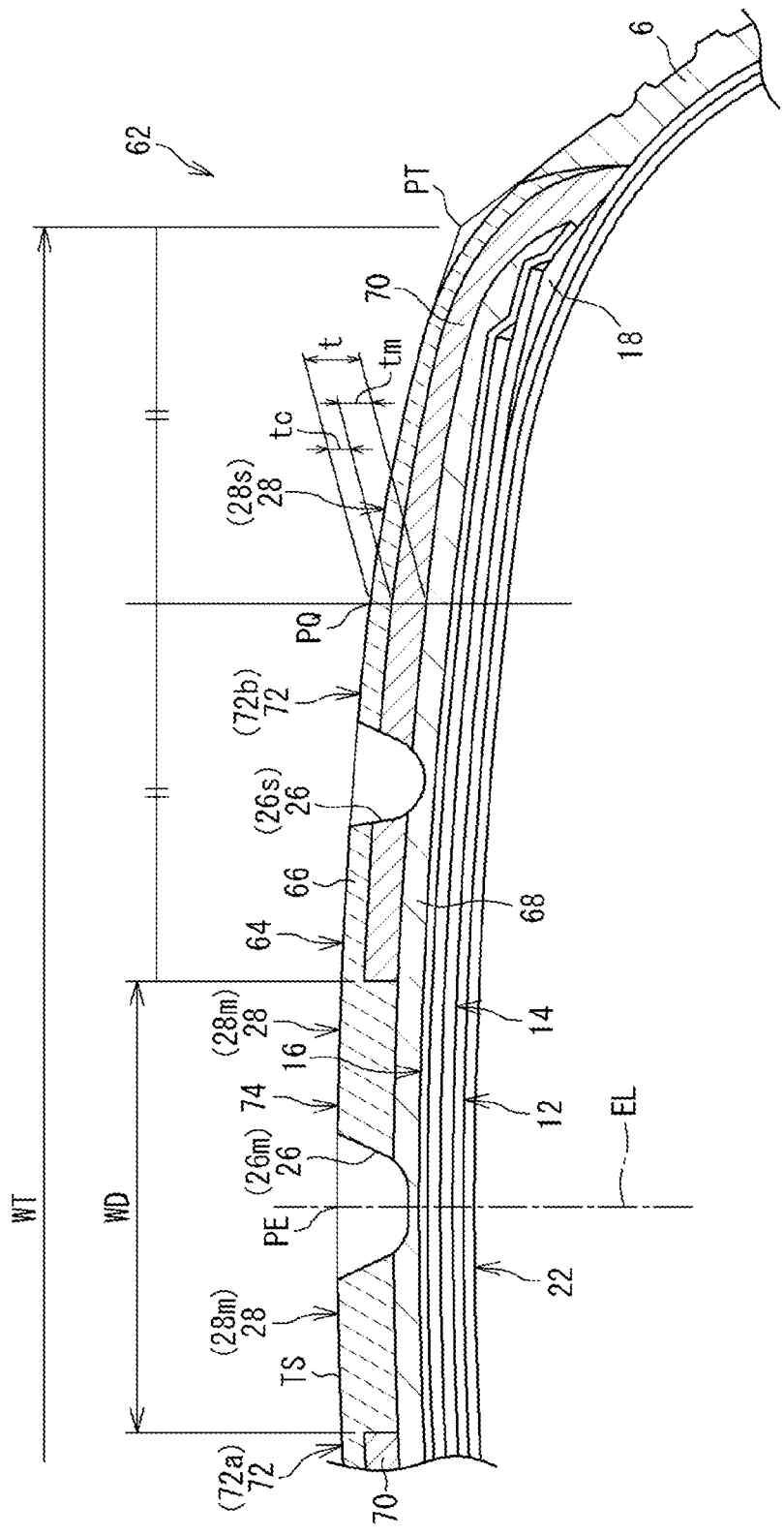
FIG. 6 is a cross-sectional view of a part of a tire according to another embodiment of the present disclosure.

FIG. 6 illustrates a part of a tire 62 according to another embodiment of the present disclosure. FIG. 6 illustrates a meridian cross-section of the tire 62. In FIG. 6, the left-right direction represents an axial direction of the tire 62, and the up-down direction represents a radial direction of the tire 62. The direction perpendicular to the surface of the drawing sheet in FIG. 6 represents a circumferential direction of the tire 62.

The tire 62 has the same components as the tire 2 shown in FIG. 1 except for a tread 64. Therefore, in FIG. 6, the same components as those of the tire 2 in FIG. 1 are denoted by the same reference characters, and the description thereof is omitted.

Similarly to the tread 4 of the tire 2 shown in FIG. 1, the tread 64 of the tire 62 also includes a cap layer 66, a base layer 68, and an intermediate layer 70. The cap layer 66 forms a part of a tire outer surface TS. The base layer 68 is disposed inwardly of the cap layer 66 in the radial direction. The intermediate layer 70 is disposed between the cap layer 66 and the base layer 68 in the radial direction. In a portion in which the cap layer 66, the base layer 68, and the intermediate layer 70 extend in the axial direction, the cap layer 66, the base layer 68, and the intermediate layer 70 are structured to have almost uniform thicknesses in a portion other than a portion near the tread reference end PT.

In the tire 62, the cap layer 66 is formed of the same crosslinked rubber as that of the cap layer 38 of the tire 2 shown in FIG. 1. The base layer 68 is formed of the same crosslinked rubber as that of the base layer 40 of the tire 2 shown in FIG. 1. The intermediate layer 70 is formed of the same crosslinked rubber as that of the intermediate layer 42 of the tire 2 shown in FIG. 1. Therefore, a loss tangent LTm of the intermediate layer 70 at 30° C. is less than a loss tangent LTc of the cap layer 66 at 30° C. A loss tangent LTb of the base layer 68 at 30° C. is less than the loss tangent LTm of the intermediate layer 70 at 30° C.

The heat generation property of the tread 64 based on the loss tangents of the cap layer 66, the base layer 68, and the intermediate layer 70 of the tire 62 is considered in the same manner as for the heat generation property of the tread 4 based on the loss tangents of the cap layer 38, the base layer 40, and the intermediate layer 42 of the tire 2 shown in FIG. 1. That is, from the viewpoint that the cap layer 66 can contribute to enhancement of wet performance, the loss tangent LTc of the cap layer 66 at 30° C. is preferably not less than 0.15. From the viewpoint that the temperature of the entirety of the tread 64 is maintained stable and low rolling resistance can be maintained, the loss tangent LTc of the cap layer 66 at 30° C. is preferably not higher than 0.30. From the viewpoint that the intermediate layer 70 can assuredly have required stiffness and can effectively contribute to enhancement of wet performance, a ratio (LTm/LTc) of the loss tangent LTm of the intermediate layer 70 at 30° C. to the loss tangent LTc of the cap layer 66 at 30° C. is preferably not less than 40%, more preferably not less than 50%, and even more preferably not less than 60%. From the viewpoint that the intermediate layer 70 can effectively contribute to reduction of rolling resistance, the ratio (LTm/LTc) is preferably not greater than 90%, more preferably not greater than 80%, and even more preferably not greater than 70%. From the viewpoint that the base layer 68 effectively contributes to reduction of rolling resistance, the loss tangent LTb of the base layer 68 at 30° C. is less than the loss tangent LTm of the intermediate layer 70 at 30° C. Specifically, the loss tangent LTb of the base layer 68 at 30° C. is preferably not higher than 0.10.

As shown in FIG. 6, the tread 64 of the tire 62 also includes a three-layer body portion 72 as a stacked body of the cap layer 66, the intermediate layer 70, and the base layer 68, and a two-layer body portion 74 as a stacked body of the cap layer 66 and the base layer 68. The two-layer body portion 74 is disposed between a first three-layer body portion 72a disposed on one side of the tire 62 in the axial direction and a second three-layer body portion 72b disposed on the other side of the tire 62 in the axial direction. The tread 64 includes at least two three-layer body portions 72 formed of the cap layer 66, the intermediate layer 70, and the base layer 68, and at least one two-layer body portion 74 that is disposed between the first three-layer body portion 72a and the second three-layer body portion 72b and is formed of the cap layer 66 and the base layer 68. The tread 64 of the tire 62 includes two three-layer body portions 72 and one two-layer body portion 74, and the three-layer body portion 72 and the two-layer body portion 74 alternate in the axial direction.

In a case where the tire 62 is new, the cap layer 66 forming the outer surface of the tread 64 comes into contact with a road surface. The cap layer 66 exhibits a high grip force, so that the tire 62 exhibits good wet performance. The tread 64 is worn due to running. In the tread 64, the two-layer body portion 74 does not include the intermediate layer 70. The two-layer body portion 74 is disposed between the two three-layer body portions 72 in the axial direction. In the axial direction, the cap layer 66 of the two-layer body portion 74 is disposed adjacent to the intermediate layer 70 of the three-layer body portion 72. Even if the tread 64 is worn until the intermediate layer 70 of the three-layer body portion 72 is exposed, the ground contact surface of the tire 62 includes the cap layer 66 of the two-layer body portion 74. In the tire 62, even in a case where the intermediate layer 70 having the loss tangent LTm close to the loss tangent LTb of the base layer 68 is used, the cap layer 66 exhibits a high grip force, and, therefore, even if the tread 64 is worn, significant degradation of wet performance is prevented. The intermediate layer 70 contributes to reduction of rolling resistance, whereby the tire 62 can achieve reduction of rolling resistance while preventing wet performance from being significantly degraded due to abrasion.

In FIG. 6, a length represented by reference character WD is a width of the two-layer body portion 74 in the axial direction. The axial width WD is represented as a distance in the axial direction between interfaces, between the cap layer 66 and the intermediate layer 70, extending substantially in the radial direction, at boundaries between the three-layer body portion 72 and the two-layer body portion 74. In a case where the distance in the axial direction is changed in the radial direction, the axial width WD of the two-layer body portion 74 is represented as an average value of the maximal distance and the minimal distance.

In the tire 62, a ratio (WD/WT) of the axial width WD of the two-layer body portion 74 to the tread width WT is preferably not less than 20% and not greater than 50%.

The ratio (WD/WT) is set to be not less than 20%, whereby the cap layer 66 included in the ground contact surface in a worn state effectively contributes to enhancement of wet performance From this viewpoint, the ratio (WD/WT) is more preferably not less than 25% and even more preferably not less than 30%.

The ratio (WD/WT) is set to be not greater than 50%, whereby influence of the cap layer 66 on rolling resistance is reduced. From this viewpoint, the ratio (WD/WT) is more preferably not greater than 45% and even more preferably not greater than 40%.

In FIG. 6, reference character PQ represents the center of the width of the three-layer body portion 72. In the tire 62, the width of the three-layer body portion 72 is represented as a distance in the axial direction from the interface, between the cap layer 66 and the intermediate layer 70, which is a reference position for measuring the axial width WD, to the tread end PT. A length represented by reference character tc is a thickness of the cap layer 66 at the position PQ. A length represented by reference character t is the total of the thickness tc of the cap layer 66 and a thickness tm of the intermediate layer 70 at the position PQ. In the tire 62, the thickness tc represents a thickness of the cap layer 66 at the three-layer body portion 72, and the total t represents the total of the thickness tc of the cap layer 66 and the thickness tm of the intermediate layer 70 at the three-layer body portion 72.

In the tire 62, a ratio (tc/t) of the thickness tc of the cap layer 66 to the total t of the thickness tc of the cap layer 66 and the thickness tm of the intermediate layer 70, at the three-layer body portion 72, is preferably not less than 30% and not greater than 50%.

The ratio (tc/t) is set to be not less than 30%, whereby the cap layer 66 effectively contributes to enhancement of wet performance From this viewpoint, the ratio (tc/t) is more preferably not less than 35%.

The ratio (tc/t) is set to be not greater than 50%, whereby influence of the cap layer 66 on rolling resistance is reduced. From this viewpoint, the ratio (tc/t) is more preferably not greater than 45%.

As described above, according to the present disclosure, the tire that can achieve reduction of rolling resistance while preventing wet performance from being significantly degraded due to abrasion can be obtained.

EXAMPLES

The present disclosure will be described below in more detail according to examples and the like. However, the present disclosure is not limited only to the examples.

[Examination 1]

Example 1

A pneumatic tire (tire size=205/55R16), for a passenger car, having the basic structure shown in FIG. 1 and specifications indicated below in Table 1 was obtained.

A tread having a cap layer, a base layer, and an intermediate layer, and having the structure shown in FIG. 4 was used. The loss tangent LTc of the cap layer at 30° C. was 0.25. The loss tangent LTm of the intermediate layer at 30° C. was 0.15. A ratio (LTm/LTc) of the loss tangent LTm to the loss tangent LTc was 60%. The loss tangent LTb of the base layer at 30° C. was 0.10.

In Example 1, a ratio (A/CW) of the total A of the thicknesses a of the cap layer forming the groove walls at a position at which the groove depth of the circumferential groove was 50% of the entire groove depth thereof, to the ground contact width CW of the reference ground contact surface, was 10%. A ratio (b/B) of the thickness b of the cap layer to the thickness B of the two-layer body portion at the groove bottom of the circumferential groove was 50%.

In Example 1, a difference (Ec−Em) between the elongation at break Ec of the cap layer and the elongation at break Em of the intermediate layer was 0%. A difference (LATc−LATm) between the LAT abrasion index of the cap layer and the LAT abrasion index of the intermediate layer was 0. The LAT abrasion index was measured by using a rubber composition for a cap layer of Comparative example 1 as a reference rubber composition.

Comparative Example 1

A tire of Comparative example 1 was obtained in the same manner as in Example 1 except that the intermediate layer was stacked on the base layer and the cap layer was stacked on the intermediate layer in the radial direction, and a material of rubber was changed and the loss tangent LTm of the intermediate layer was thus changed, and a ratio (LTm/LTc) was as indicated below in Table 1. In Comparative example 1, the tread did not have two-layer body portions formed therein. The groove wall of the circumferential groove included an interface between the cap layer and the intermediate layer, and an interface between the intermediate layer and the base layer.

In Comparative example 1, a difference (Ec−Em) between the elongation at break Ec of the cap layer and the elongation at break Em of the intermediate layer was 0%. A difference (LATc−LATm) between the LAT abrasion index of the cap layer and the LAT abrasion index of the intermediate layer was 0.

Examples 2 to 3

Tires of Examples 2 to 3 were each obtained in the same manner as in Example 1 except that the thickness a of the cap layer forming the groove wall of the circumferential groove was changed and a ratio (A/CW) was as indicated below in Table 1.

Examples 4 to 5

Tires of Examples 4 to 5 were each obtained in the same manner as in Example 1 except that the thickness b of the cap layer at the groove bottom of the circumferential groove was changed and a ratio (b/B) was as indicated below in Table 1.

Example 6

A tire of Example 6 was obtained in the same manner as in Example 1 except that a material of rubber was changed and the loss tangent LTm of the intermediate layer was thus changed, and a ratio (LTm/LTc) was as indicated below in Table 1.

In Example 6, a difference (Ec−Em) between the elongation at break Ec of the cap layer and the elongation at break Em of the intermediate layer was 0%. A difference (LATc−LATm) between the LAT abrasion index of the cap layer and the LAT abrasion index of the intermediate layer was 0.

[Rolling Resistance Coefficient (RRC)]

A rolling resistance coefficient (RRC) was measured by using a rolling resistance testing machine when running with the sample tire on a drum under the following conditions was performed at a speed of 80 km/h. The results are indicated below as indexes in Table 1. The greater the value is, the lower rolling resistance of the tire is.

Rim: 16×6.5 J

Internal pressure: 210 kPa

Vertical load: 4.82 kN

[Wet Performance (WET) of Worn Tire]

A new sample tire was mounted on a rim (size=16×7 J) and inflated with air to adjust an internal pressure of the tire to 250 kPa. The tire was mounted to a test vehicle (passenger car). The test vehicle was caused to run on a dry asphalt road surface in a test course to wear the tread of the tire. The tread was worn until the groove depth of the circumferential groove reached 50% of the groove depth of the new tire. Thereafter, the test vehicle was caused to run on a wet road surface (water film thickness=1.4 mm) in a test course. The test vehicle was braked in a state where the test vehicle was running at a speed of 100 km/h, and a running distance (braking distance) from a time when the test vehicle was braked to a time when the test vehicle stopped was measured. The results are indicated below as indexes in Table 1. The greater the value is, the shorter the braking distance is and the more excellent wet performance of the tire is.

[Chipping Resistance (Chipping) of Worn Tire]

A new sample tire was mounted on a rim (size=16×7 J) and inflated with air to adjust an internal pressure of the tire to 250 kPa. The tire was mounted to a test vehicle (passenger car). The test vehicle was caused to run on a dry asphalt road surface in a test course to wear the tread of the tire. The tread was worn until the groove depth of the circumferential groove reached 50% of the groove depth of the new tire. Thereafter, the test vehicle was caused to run on an unpaved road surface including debris in a test course. After the test vehicle ran 3000 km, an outer appearance of the tread was visually observed, and occurrence of chipping (the sizes and the number of chipped portions) was checked. The results are indicated below as indexes in Table 1. The greater the value is, the less occurrence of the chipping is and the more excellent chipping resistance of the tire is.

[Overall Performance]

The total of the indexes obtained in the evaluations was calculated. The results are indicated below in cells for "Overall" in Table 1. The greater the value is, the better the evaluation is.

TABLE 1

|  | Comparative example 1 | Example 2 | Example 1 | Example 3 | Example 4 | Example 5 | Example 6 |
| --- | --- | --- | --- | --- | --- | --- | --- |
| LTm/LTc [%] | 90 | 60 | 60 | 60 | 60 | 60 | 80 |
| A/CW [%] | — | 5 | 10 | 15 | 10 | 10 | 10 |
| b/B [%] | — | 50 | 50 | 50 | 30 | 70 | 50 |
| RRC | 100 | 106 | 105 | 103 | 106 | 102 | 102 |
| WET | 100 | 100 | 105 | 106 | 105 | 105 | 107 |
| Chipping resistance | 100 | 105 | 110 | 110 | 110 | 110 | 110 |
| Overall | 300 | 311 | 320 | 319 | 321 | 317 | 319 |

[Examination 2]

Example 7

A tire of Example 7 was obtained in the same manner as in Example 1 except that the structure of the tread of the tire was as indicated in FIG. 6. Rubbers of a cap layer, an intermediate layer, and a base layer in Example 7 were the same as the rubbers of the cap layer, the intermediate layer, and the base layer, respectively, in Example 1.

In Example 7, a ratio (WD/WT) of the axial width WD of the two-layer body portion to the tread width WT was 30%. A ratio (tc/t) of the thickness tc of the cap layer to the total t of the thickness tc of the cap layer and the thickness tm of the intermediate layer at the three-layer body portion was 30%.

Comparative Example 2

A tire of Comparative example 2 was obtained in the same manner as in Example 7 except that the intermediate layer was formed of the same rubber as that of the cap layer. The tread of Comparative example 2 did not have the two-layer body portion formed therein.

Comparative Example 3

A tire of Comparative example 3 was obtained in the same manner as in Example 7 except that the intermediate layer was stacked on the base layer, and the cap layer was stacked on the intermediate layer in the radial direction. The tread of Comparative example 3 did not have the two-layer body portion formed therein.

Example 8

A tire of Example 8 was obtained in the same manner as in Example 7 except that the thickness tc of the cap layer at the three-layer body portion was changed and a ratio (tc/t) was as indicated below in Table 2.

Example 9

A tire of Example 9 was obtained in the same manner as in Example 7 except that the width WD of the two-layer body portion was changed and a ratio (WD/WT) was as indicated below in Table 2.

Example 10

A tire of Example 10 was obtained in the same manner as in Example 7 except that a material of rubber was changed and the loss tangent LTm of the intermediate layer was thus changed, and a ratio (LTm/LTc) was as indicated below in Table 2.

In Example 10, a difference (Ec−Em) between the elongation at break Ec of the cap layer and the elongation at break Em of the intermediate layer was 0%. A difference (LATc−LATm) between the LAT abrasion index of the cap layer and the LAT abrasion index of the intermediate layer was 0.

[Rolling Resistance Coefficient (RRC)]

A rolling resistance coefficient (RRC) was measured by using a rolling resistance testing machine when running with the sample tire on a drum under the following conditions was performed at a speed of 80 km/h. The results are indicated below as indexes in Table 2. The greater the value is, the lower rolling resistance of the tire is.

Rim: 16×6.5 J
Internal pressure: 210 kPa
Vertical load: 4.82 kN

[Wet Performance (WET) of New Tire]

A new sample tire was mounted on a rim (size=16×7.0 J) and inflated with air to adjust an internal pressure of the tire to 250 kPa. The tire was mounted to a test vehicle (passenger car). The test vehicle was caused to run on a wet road surface (water film thickness=1.4 mm) in a test course. The test vehicle was braked in a state where the test vehicle was running at a speed of 80 km/h, and a running distance (braking distance) from a time when the test vehicle was braked to a time when the test vehicle stopped was measured. The results are indicated below as indexes in cells for "WET (NEW)" in Table 2. The greater the value is, the shorter the braking distance is and the more excellent wet performance of the tire is.

[Wet Performance (WET) of Worn Tire]

A new sample tire was mounted on a rim (size=16×7.0 J) and inflated with air to adjust an internal pressure of the tire to 250 kPa. The tire was mounted to a test vehicle (passenger car). The test vehicle was caused to run on a dry asphalt road surface in a test course to wear the tire. Wet performance of the worn tire was evaluated in the same manner as the manner for wet performance of the new tire as described above at a time when the groove depth reached 70% of the groove depth of the new tire. The results are indicated below as indexes in cells for "WET (OLD)" in Table 2. The greater the value is, the shorter the braking distance is and the more excellent wet performance of the tire is. In this evaluation, an index of not less than 55 is required as an allowable index for maintaining good wet performance of the tire.

[Overall Performance]

The total of the indexes obtained in the evaluations was calculated. The results are indicated below in cells for "Overall" in Table 2. The greater the value is, the better the evaluation is.

As indicated in Tables 1 and 2, in the Examples, it is confirmed that reduction of rolling resistance can be achieved while wet performance is prevented from being significantly degraded due to abrasion. The evaluation results clearly indicate that technique of the present disclosure is superior.

The above-described technique capable of achieving reduction of rolling resistance while preventing wet performance from being significantly degraded due to abrasion is applicable to various tires.

Preferably, in the tire, the circumferential groove is formed in the two-layer body portion, and a groove bottom and groove walls of each circumferential groove are formed of the cap layer.

Preferably, in the tire, a ratio of a total of thicknesses of the cap layer forming the groove walls at a position at which a groove depth of the circumferential groove is 50% of an entire groove depth thereof, relative to a ground contact width of the reference ground contact surface, is not less than 5% and not greater than 15%.

Preferably, in the tire, a ratio of a thickness of the cap layer to a thickness of the two-layer body portion, at the groove bottom of the circumferential groove, is not less than 30% and not greater than 70%.

Preferably, in the tire, the outer surface of the tire includes a tread surface and a pair of side surfaces continuous with ends of the tread surface. Preferably, on a meridian cross-section of the tire, a contour of the tread surface includes a plurality of curved contour lines formed as arcs having different radii. A contour of the outer surface of the tire preferably includes, in each of end portions of the tread surface, a curved line portion that is formed as a curved contour line connected to a corresponding one of the side surfaces and is formed as an arc having a smallest radius among the plurality of curved contour lines included in the contour of the tread surface, an inner adjacent contour line disposed inwardly of the curved line portion in an axial direction in contact with the curved line portion, and an outer adjacent contour line disposed outwardly of the curved line portion in the axial direction in contact with the curved line portion. Preferably, tread reference ends are each represented as an intersection point of a line tangent to the curved line portion at a contact point at which the inner adjacent contour line and the curved line portion are in contact with each other, and a line tangent to the curved line portion at a contact point at which the outer adjacent contour line and the curved line portion are in contact with each other. Preferably, a distance, in the axial direction, from one of the tread reference ends to another of the tread reference ends is a tread width. Preferably, a ratio of an axial width of the two-layer body portion to the tread width is not less than 20% and not greater than 50%.

Preferably, in the tire, a ratio of a thickness of the cap layer to a total of the thickness of the cap layer and a

TABLE 2

|  | Comparative example 2 | Comparative example 3 | Example 7 | Example 8 | Example 9 | Example 10 |
| --- | --- | --- | --- | --- | --- | --- |
| LTm/LTc [%] | 100 | 60 | 60 | 60 | 60 | 50 |
| WD/WT [%] | — | — | 30 | 30 | 50 | 30 |
| tc/t [%] | — | — | 30 | 40 | 30 | 30 |
| RRC | 100 | 107 | 112 | 110 | 110 | 113 |
| WET (NEW) | 100 | 100 | 100 | 100 | 100 | 100 |
| WET (OLD) | 65 | 39 | 60 | 61 | 60 | 58 |
| Overall | 265 | 246 | 272 | 271 | 270 | 271 | thickness of the intermediate layer at each three-layer body portion is not less than 30% and not greater than 50%.

Preferably, in the tire, a ratio of the loss tangent of the intermediate layer at 30° C. to the loss tangent of the cap layer at 30° C. is not less than 40% and not greater than 90%.

Preferably, in the tire, a difference between a LAT abrasion index of the cap layer and a LAT abrasion index of the intermediate layer is not less than −10 and not greater than 10.

Preferably, in the tire, a difference between an elongation at break of the cap layer and an elongation at break of the intermediate layer is not less than −20% and not greater than 20%.

According to the present disclosure, the tire that can achieve reduction of rolling resistance while preventing wet performance from being significantly degraded due to abrasion is obtained.

What is claimed is:

1. A tire comprising:
  a tread configured to come into contact with a road surface,
  wherein at least three circumferential grooves are formed in the tread,
  wherein a ground contact surface obtained by mounting the tire on a normal rim, adjusting an internal pressure of the tire to a normal internal pressure, applying a load that is 70% of a normal load, to the tire, as a vertical load, and bringing the tire into contact with a planar road surface, is a reference ground contact surface,
  wherein the tread comprises a cap layer forming a part of an outer surface of the tire, a base layer disposed inwardly of the cap layer in a radial direction, and an intermediate layer disposed between the cap layer and the base layer in the radial direction,
  wherein a loss tangent of the intermediate layer at 30° C. is less than a loss tangent of the cap layer at 30° C. and a loss tangent of the base layer at 30° C. is less than the loss tangent of the intermediate layer at 30° C.,
  wherein the tread comprises at least two three-layer body portions formed of the cap layer, the intermediate layer, and the base layer, and at least one two-layer body portion that is formed of the cap layer and the base layer and disposed between a first three-layer body portion and a second three-layer body portion,
  wherein the circumferential groove is formed in the two-layer body portion,
  wherein a groove bottom and groove walls of each circumferential groove are formed of the cap layer, and
  wherein a ratio of a total of thicknesses of the cap layer forming the groove walls at a position at which a groove depth of the circumferential groove is 50% of an entire groove depth thereof, relative to a ground contact width of the reference ground contact surface, is not less than 5% and not greater than 15%.

2. The tire according to claim 1,
  wherein the outer surface of the tire comprises a tread surface and a pair of side surfaces continuous with ends of the tread surface,
  wherein, on a meridian cross-section of the tire, a contour of the tread surface comprises a plurality of curved contour lines formed as arcs having different radii,
  wherein a contour of the outer surface of the tire comprises, in each of end portions of the tread surface, a curved line portion that is formed as a curved contour line connected to a corresponding one of the side surfaces and is formed as an arc having a smallest radius among the plurality of curved contour lines included in the contour of the tread surface, an inner adjacent contour line disposed inwardly of the curved line portion in an axial direction in contact with the curved line portion, and an outer adjacent contour line disposed outwardly of the curved line portion in the axial direction in contact with the curved line portion,
  wherein tread reference ends are each represented as an intersection point of a line tangent to the curved line portion at a contact point at which the inner adjacent contour line and the curved line portion are in contact with each other, and a line tangent to the curved line portion at a contact point at which the outer adjacent contour line and the curved line portion are in contact with each other,
  wherein a distance, in the axial direction, from one of the tread reference ends to another of the tread reference ends is a tread width, and
  wherein a ratio of an axial width of the two-layer body portion to the tread width is not less than 20% and not greater than 50%.

3. The tire according to claim 1, wherein a ratio of the loss tangent of the intermediate layer at 30° C. to the loss tangent of the cap layer at 30° C. is not less than 40% and not greater than 90%.

4. The tire according to claim 1, wherein a difference between a LAT abrasion index of the cap layer and a LAT abrasion index of the intermediate layer is not less than −10 and not greater than 10.

5. The tire according to claim 1, wherein a difference between an elongation at break of the cap layer and an elongation at break of the intermediate layer is not less than −20% and not greater than 20%.

6. The tire according to claim 1, further comprising:
  a belt, disposed inwardly of the tread in a radial direction of the tire, that includes at least an inner layer and an outer layer stacked on each other in the radial direction,
  wherein a length from an end of the outer layer in an axial direction of the tire to a length of an end of the inner layer in the axial direction is not less than 3 mm and not greater than 10 mm.

7. The tire according to claim 1, further comprising:
  a belt, disposed inwardly of the tread in a radial direction of the tire, that includes at least an inner layer and an outer layer stacked on each other in the radial direction,
  wherein the inner layer is wider than the outer layer in the radial direction.

8. The tire according to claim 1, wherein a ratio of a total of thicknesses of the cap layer forming the groove walls at a position at which a groove depth of the circumferential groove is 50% of an entire groove depth thereof, relative to a ground contact width of the reference ground contact surface, is not less than 9% and not greater than 11%.

9. The tire according to claim 1, wherein
  the loss tangent of the cap layer at 30° C. is not less than 0.15 and not greater than 0.30,
  the loss tangent of the intermediate layer at 30° C. is not greater than 0.15 and not less than 0.10, and
  the loss tangent of the base layer at 30° C. is not greater than 0.10.

10. The tire according to claim 1, wherein a portion of the cap layer forming the groove walls of each circumferential groove, which forms an interface with the intermediate layer, has a uniform thickness.

11. The tire according to claim 1, wherein a LAT abrasion index of the cap layer and a LAT abrasion index of the intermediate layer are the same.

12. The tire according to claim 1, wherein a ratio of a thickness of the cap layer to a thickness of the two-layer body portion, at the groove bottom of the circumferential groove, is not less than 30% and not greater than 70%.

13. The tire according to claim 12,
wherein the outer surface of the tire comprises a tread surface and a pair of side surfaces continuous with ends of the tread surface,
wherein, on a meridian cross-section of the tire, a contour of the tread surface comprises a plurality of curved contour lines formed as arcs having different radii,
wherein a contour of the outer surface of the tire comprises, in each of end portions of the tread surface, a curved line portion that is formed as a curved contour line connected to a corresponding one of the side surfaces and is formed as an arc having a smallest radius among the plurality of curved contour lines included in the contour of the tread surface, an inner adjacent contour line disposed inwardly of the curved line portion in an axial direction in contact with the curved line portion, and an outer adjacent contour line disposed outwardly of the curved line portion in the axial direction in contact with the curved line portion,
wherein tread reference ends are each represented as an intersection point of a line tangent to the curved line portion at a contact point at which the inner adjacent contour line and the curved line portion are in contact with each other, and a line tangent to the curved line portion at a contact point at which the outer adjacent contour line and the curved line portion are in contact with each other,
wherein a distance, in the axial direction, from one of the tread reference ends to another of the tread reference ends is a tread width, and
wherein a ratio of an axial width of the two-layer body portion to the tread width is not less than 20% and not greater than 50%.

14. The tire according to claim 12, wherein a ratio of the thickness of the cap layer to a total of the thickness of the cap layer and a thickness of the intermediate layer at each three-layer body portion is not less than 30% and not greater than 50%.

15. The tire according to claim 12, wherein a ratio of the loss tangent of the intermediate layer at 30° C. to the loss tangent of the cap layer at 30° C. is not less than 40% and not greater than 90%.

16. A tire comprising:
a tread configured to come into contact with a road surface,
wherein at least three circumferential grooves are formed in the tread,
wherein a ground contact surface obtained by mounting the tire on a normal rim, adjusting an internal pressure of the tire to a normal internal pressure, applying a load that is 70% of a normal load, to the tire, as a vertical load, and bringing the tire into contact with a planar road surface, is a reference ground contact surface,
wherein the tread comprises a cap layer forming a part of an outer surface of the tire, a base layer disposed inwardly of the cap layer in a radial direction, and an intermediate layer disposed between the cap layer and the base layer in the radial direction,
wherein a loss tangent of the intermediate layer at 30° C. is less than a loss tangent of the cap layer at 30° C. and a loss tangent of the base layer at 30° C. is less than the loss tangent of the intermediate layer at 30° C.,
wherein the tread comprises at least two three-layer body portions formed of the cap layer, the intermediate layer, and the base layer, and at least one two-layer body portion that is formed of the cap layer and the base layer and disposed between a first three-layer body portion and a second three-layer body portion,
wherein the outer surface of the tire comprises a tread surface and a pair of side surfaces continuous with ends of the tread surface,
wherein, on a meridian cross-section of the tire, a contour of the tread surface comprises a plurality of curved contour lines formed as arcs having different radii,
wherein a contour of the outer surface of the tire comprises, in each of end portions of the tread surface, a curved line portion that is formed as a curved contour line connected to a corresponding one of the side surfaces and is formed as an arc having a smallest radius among the plurality of curved contour lines included in the contour of the tread surface, an inner adjacent contour line disposed inwardly of the curved line portion in an axial direction in contact with the curved line portion, and an outer adjacent contour line disposed outwardly of the curved line portion in the axial direction in contact with the curved line portion,
wherein tread reference ends are each represented as an intersection point of a line tangent to the curved line portion at a contact point at which the inner adjacent contour line and the curved line portion are in contact with each other, and a line tangent to the curved line portion at a contact point at which the outer adjacent contour line and the curved line portion are in contact with each other,
wherein a distance, in the axial direction, from one of the tread reference ends to another of the tread reference ends is a tread width,
wherein a ratio of an axial width of the two-layer body portion to the tread width is not less than 20% and not greater than 50%, and
wherein a ratio of a thickness of the cap layer to a total of the thickness of the cap layer and a thickness of the intermediate layer at each three-layer body portion is not less than 30% and not greater than 50%.

17. The tire according to claim 16, wherein a ratio of the loss tangent of the intermediate layer at 30° C. to the loss tangent of the cap layer at 30° C. is not less than 40% and not greater than 90%.

18. A tire comprising:
a tread configured to come into contact with a road surface,
wherein at least three circumferential grooves are formed in the tread,
wherein a ground contact surface obtained by mounting the tire on a normal rim, adjusting an internal pressure of the tire to a normal internal pressure, applying a load that is 70% of a normal load, to the tire, as a vertical load, and bringing the tire into contact with a planar road surface, is a reference ground contact surface,
wherein the tread comprises a cap layer forming a part of an outer surface of the tire, a base layer disposed inwardly of the cap layer in a radial direction, and an intermediate layer disposed between the cap layer and the base layer in the radial direction,
wherein a loss tangent of the intermediate layer at 30° C. is less than a loss tangent of the cap layer at 30° C. and a loss tangent of the base layer at 30° C. is less than the loss tangent of the intermediate layer at 30° C., wherein the tread comprises at least two three-layer body portions formed of the cap layer, the intermediate layer, and the base layer, and at least one two-layer body portion that is formed of the cap layer and the base layer and disposed between a first three-layer body portion and a second three-layer body portion, and wherein the tread further comprises four three-layer body portions and three two-layer body portions, and the three-layer body portions and the two-layer body portions are positioned alternately in an axial direction of the tire.

\* \* \* \* \*